(12) United States Patent
Mann et al.

(10) Patent No.: US 9,527,134 B2
(45) Date of Patent: Dec. 27, 2016

(54) METHOD OF PRODUCING TEXTURED SURFACES

(75) Inventors: James Bradley Mann, West Lafayette, IN (US); Srinivasan Chandrasekar, West Lafayette, IN (US); Christopher Javellana Saldana, Springfield, VA (US); Yang Guo, West Lafayette, IN (US); Walter Dale Compton, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 617 days.

(21) Appl. No.: 14/007,995

(22) PCT Filed: Mar. 30, 2012

(86) PCT No.: PCT/US2012/031564
§ 371 (c)(1),
(2), (4) Date: Nov. 6, 2013

(87) PCT Pub. No.: WO2012/135691
PCT Pub. Date: Oct. 4, 2012

(65) Prior Publication Data
US 2014/0047959 A1  Feb. 20, 2014

Related U.S. Application Data

(60) Provisional application No. 61/469,963, filed on Mar. 31, 2011.

(51) Int. Cl.
B23B 29/00 (2006.01)
B23B 1/00 (2006.01)
(Continued)

(52) U.S. Cl.
CPC .............. *B23B 1/00* (2013.01); *B23B 27/22* (2013.01); *B23B 35/00* (2013.01); *B23B 47/34* (2013.01); *C21D 2261/00* (2013.01); *Y10T 82/10* (2015.01)

(58) Field of Classification Search
CPC ........ B23B 29/125; B23B 29/046; B22F 9/04; B23K 26/0084
See application file for complete search history.

(56) References Cited

U.S. PATENT DOCUMENTS 5,113,728 A * 5/1992 Medeksza ............... B32B 25/02
408/1 R
5,338,915 A * 8/1994 Hildebrand ........ B23K 26/0084
219/121.61

(Continued)

*Primary Examiner* — Will Fridie, Jr.
(74) *Attorney, Agent, or Firm* — Hartman Global IP Law; Gary M. Hartman; Domenica N. S. Hartman

(57) ABSTRACT

Methods suitable for producing textured surfaces in surfaces of objects, by which the methods are able to achieve a desired three-dimensional surface topography and optionally a desired subsurface microstructure through the use of a controlled modulation machining technique. The methods include selecting a predetermined surface texture for a surface of a body, and then imposing a superimposed sinusoidal feed-modulation on a cutting tool so as to move the cutting tool in a feed direction relative to the body while machining the body with the cutting tool and generating a machined surface of the body. The surface texture of the machined surface is intentionally controlled by at least the modulation amplitude and the modulation frequency of the superimposed sinusoidal feed-modulation.

16 Claims, 7 Drawing Sheets

(51) Int. Cl.
   *B23B 27/22* (2006.01)
   *B23B 35/00* (2006.01)
   *B23B 47/34* (2006.01)

(56) References Cited

U.S. PATENT DOCUMENTS

| | | | | |
|---|---|---|---|---|
| 5,342,152 | A * | 8/1994 | Medeksza | B23B 25/02 |
| | | | | 408/1 R |
| 5,669,433 | A | 9/1997 | Sterett et al. | |
| 6,084,363 | A * | 7/2000 | Mizumoto | H02N 2/067 |
| | | | | 310/316.02 |
| 7,587,965 | B2 * | 9/2009 | Mann | B23B 27/045 |
| | | | | 184/6.1 |
| 7,628,099 | B2 * | 12/2009 | Mann | B22F 9/04 |
| | | | | 148/308 |
| 7,822,294 | B2 * | 10/2010 | Ohlinger | B23K 26/36 |
| | | | | 345/679 |
| 2002/0150496 | A1 * | 10/2002 | Chandrasekar | B22F 1/0018 |
| | | | | 419/33 |
| 2011/0066277 | A1 * | 3/2011 | Mann | B23B 29/125 |
| | | | | 700/174 |

* cited by examiner

METHOD OF PRODUCING TEXTURED SURFACES

BACKGROUND OF THE INVENTION

The present invention generally relates to methods of producing textured surfaces characterized by a desirable three-dimensional surface topography. More particularly, this invention relates to methods of producing textured surfaces and optionally desired subsurface microstructures through the use of controlled modulation machining techniques.

Developments in cutting tool technology have been generally directed to the use of advanced materials and coatings, unique geometries, and combinations thereof to improve tool life, reduce cutting forces, and reduce machining effluent streams. Geometric chip breaker features on cutting tools have been introduced specifically to promote chip breakage, though generally without the capability of controlling the size of the machine chips. Chip breakage during drilling has also been achieved through modulation, in which the drill bit is axially displaced in a cyclical manner. In addition to achieving chip breakage, modulation-assisted drilling has also been demonstrated to improve drilling performance and reduce the need for cutting fluids.

Aside from the above, current state-of-the art machining practices do not consider modulation as a desirable parameter. In contrast, U.S. Pat. No. 7,628,099 to Mann et al. discloses a modulation-controlled machining technique capable of controllably producing chips having desired shapes and sizes, and U.S. Pat. No. 7,587,965 to Mann et al. discloses a tool holder assembly and method particularly well suited for intentionally inducing modulation in a machining process, including the modulation-controlled machining technique of U.S. Pat. No. 7,628,099.

Cutting tool technology is also pertinent to the resulting surface finishes of the workpieces machined. In addition to the basic aspect of surface finish, the three-dimensional topography of a surface, referred to herein as surface texturing, is another important variable that can affect the functional performance of a component. As a nonlimiting example, functional characteristics of a bearing, including run-in, wear, torque, and lubrication, are determined by surface texture. Other characteristics of interest include surface reflectivity, the ability to assemble components, the ability to couple components, etc. Consequently, the ability to effect and control surface texturing has the potential to enhance various performance parameters of components and assemblies, such as durability and energy efficiency, especially if surface texturing can be controlled over a large area of a component.

Conventional texturing methods, such as imprint lithography, electro-discharge machining, electrochemical machining and laser beam processing, are generally performed on a surface after the desired macroscopic dimensions of the component have been achieved, for example, by machining. As such, a drawback of conventional texturing methods is that they entail at least one additional step, and therefore incur additional equipment, time and cost to complete.

BRIEF DESCRIPTION OF THE INVENTION

The present invention provides methods suitable for producing textured surfaces in surfaces of objects, by which desired three-dimensional surface topographies and optionally subsurface microstructures can be achieved through the use of a controlled modulation machining technique.

According to a first aspect of the invention, the method includes selecting a predetermined surface texture for a surface of a body, and then imposing a superimposed sinusoidal feed-modulation on a cutting tool so as to move the cutting tool in a feed direction relative to the body while machining the body with the cutting tool to generate the predetermined surface texture in a machined surface of the body. The superimposed sinusoidal feed-modulation includes a modulation frequency and a modulation amplitude in the feed direction, and the surface texture of the machined surface is intentionally controlled by at least the modulation amplitude and the modulation frequency of the superimposed sinusoidal feed-modulation.

Other aspects of the invention include imposing a superimposed sinusoidal velocity-modulation on the cutting tool so as to move the cutting tool in the cutting direction relative to the body, and inducing essentially the same microstructure in the chips and in the machined surface of the body.

A technical effect of the invention is the ability to generate specific surface textures in the surface of a body using a machining technique that is less complex, less expensive and more versatile than current procedures used to create surface texturing. Furthermore, the invention has been shown to be able to associate certain types of surface textures with modulation conditions capable of producing them, enabling the typography of a machined surface to be tailored to promote certain functional characteristics, such as improved lubrication, reduced friction and energy dissipation in component service, improved functionality, and potentially increased product durability and life.

Other aspects and advantages of this invention will be better appreciated from the following detailed description.

DETAILED DESCRIPTION OF THE INVENTION

The invention provides methods of producing textured surfaces characterized by desirable three-dimensional surface topographies, and optionally desirable subsurface microstructures, through the use of controlled modulation-assisted machining techniques. Because desirable surface textures can be directly produced, the need for additional secondary surface treatment steps can be eliminated or at least significantly reduced. The machining conditions of the modulation-assisted machining techniques may create continuous chips (for example, ribbons, wires, filaments) or discrete chips (for example, particulates and platelets), depending on the particular modulation conditions superimposed on the machining operation, providing the capability of producing chips of various shapes and sizes, ranging from a few nanometers to several millimeters in length. Consequently, the term "chip" is used herein to encompass essentially any form that can be produced by a machining operation.

Figure 1:
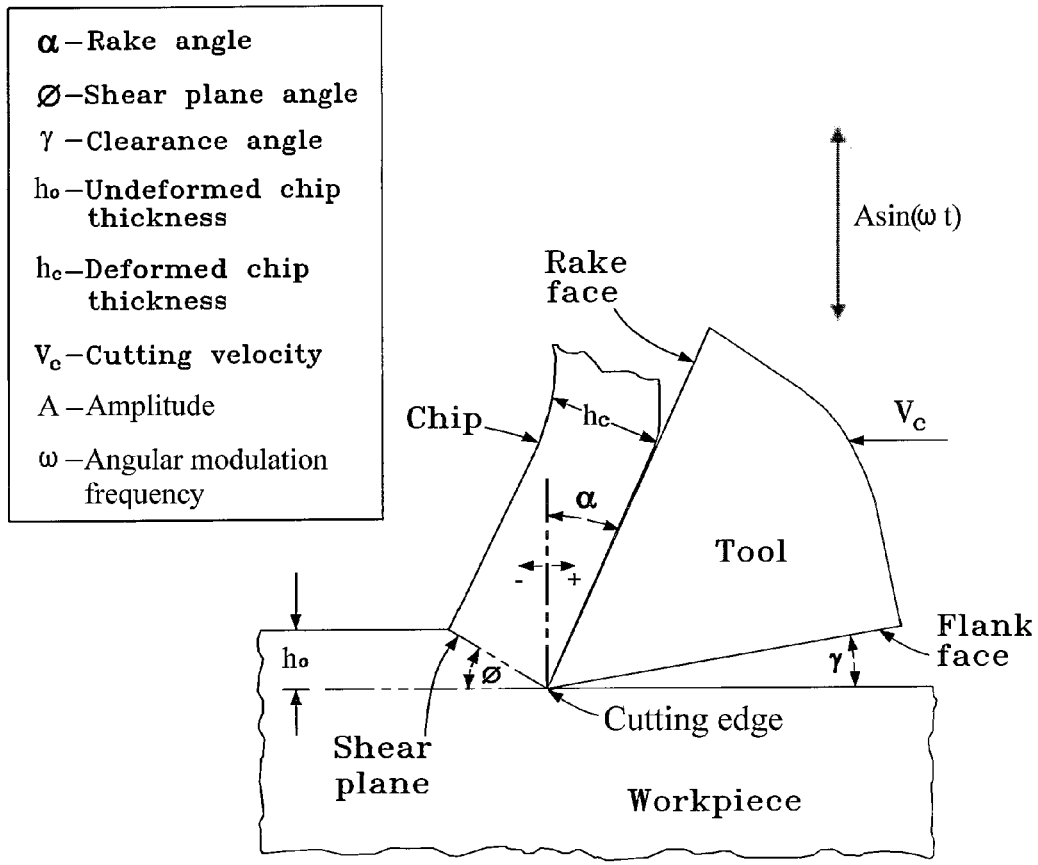
FIG. 1 schematically represents the process of machining a body with a cutting tool to which a feed-direction modulation-assisted machining technique is applied in accordance with an embodiment of this invention.

As reported in U.S. Pat. No. 6,706,324, under appropriate machining conditions sufficiently high strain deformation can occur during chip formation to lead to significant grain refinement and development of nanocrystalline microstructure in metals and alloys. As background to the present invention, conditions for high strain deformation will be discussed briefly in reference to FIG. 1, which represents the machining (for example, lathe turning) of a workpiece surface with a wedge-shaped indenter (tool). The material being removed by large strain deformation, namely, the chip, slides over the surface of the tool known as the rake face. The angle between the rake face of the tool and the normal to the work surface is known as the rake angle ($\alpha$). The edge of the wedge penetrating the workpiece is the cutting edge. The amount of interference between the tool and the workpiece is the undeformed chip thickness or depth of cut ($h_o$), and the relative velocity between the tool and the workpiece is the cutting velocity ($V_c$). When the tool cutting edge is perpendicular to the cutting velocity and the width of cut is small compared to the cutting edge length and $h_o$, a state of plane strain deformation prevails, which is believed to be a preferred configuration for experimental and theoretical investigations of machining. In FIG. 1, chip formation is seen to occur by concentrated shear along a plane called the shear plane, where a shear strain ($\gamma$) is imposed during chip formation. The shear plane angle ($\phi$) is a known function of $h_o$ and $h_c$, the latter being the deformed chip thickness.

According to a preferred aspect of the invention, FIG. 1 further represents the tool as being modulated in the direction of tool-feed or undeformed chip thickness ($h_c$). Such modulation, which may be referred to as feed-modulation, is applicable to other machining operations, most notably drilling, in addition to the turning operation represented in FIG. 1. U.S. Pat. Nos. 7,628,099 and 7,587,965 disclose modulation-controlled machining techniques and devices that are capable of controllably producing chips having desired shapes and sizes. Modulation devices of the type disclosed in U.S. Pat. No. 7,587,965 are particularly well suited for use in the feed-modulation technique of the present invention, though it is foreseeable that other modulation devices could be adapted or developed for this purpose. While aspects of the modulation-controlled machining techniques and devices disclosed in these patents will not be repeated here, it should be understood that such aspects can be beneficial and used in various implementations of the present invention.

Feed-modulation has fundamentally different kinematics as compared to modulation in the direction of cutting velocity ($V_c$), referred to herein as velocity-modulation. The feed-modulation is indicated in FIG. 1 as a sinusoidal modulation, $A \sin(2\omega t)$, superimposed onto the continuous linear motion of a tool, where A is the amplitude of the superimposed modulation and $\omega$ is the angular modulation frequency, which in turn is related to the modulation frequency, $f_m$, by $\omega = 2\pi f_m$. Though the cutting speed, $V_c$, is unaffected by the superimposed feed modulation, the sinusoidal velocity imparted by the feed modulation has a magnitude of $2\pi f_m A \cos(2\pi f_m t)$ parallel to the undeformed chip thickness, $h_o$. Unlike conventional machining (where $f_m = 0$ or $A = 0$), the instantaneous undeformed chip thickness is not constant but varies with time (t) between some maximum and minimum value as $h(t) = h_o + A \sin(2\pi f_m t)$, where $h_o$ is the undeformed chip thickness in the absence of the modulation. This is under the assumption that the initial surface over which the tool makes the cutting pass is flat, as shown in FIG. 1. It should be evident that if A is sufficiently large and in excess of some critical value, then h(t) becomes equal to or less than zero during each cycle of modulation, resulting in the production of discrete chips at the rate of $f_m$ per second. Also, at this condition, the tool-chip contact is disrupted $f_m$ times per second.

Figure 2:
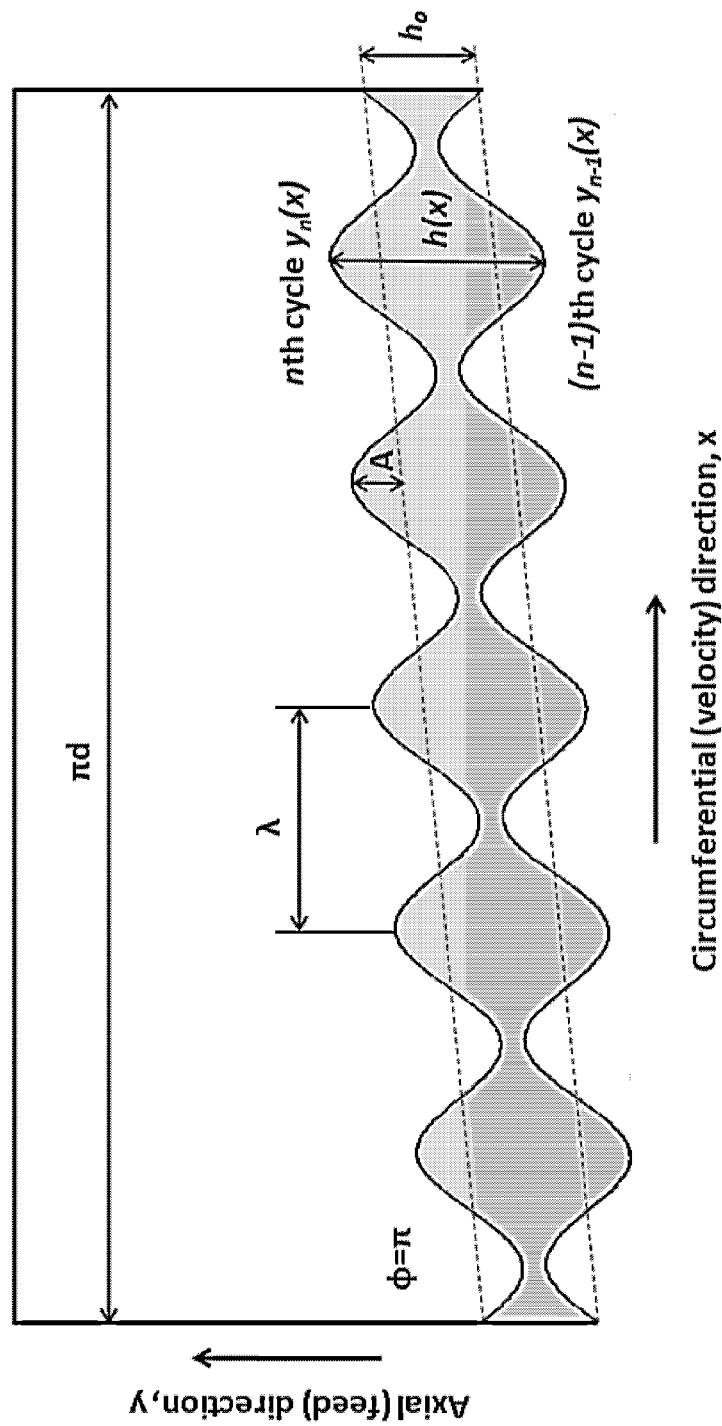
FIG. 2 is a two-dimensional model of geometry in cylindrical turning with modulation amplitude.

The critical value of the modulation amplitude (A) needed to realize discrete chip formation can be estimated for general machining configurations involving continuous cutting (e.g., turning, linear machining) based on consideration of the motion of the tool. Consider lathe turning, for example, where a workpiece of diameter, d, is rotating at a frequency, $f_w$, and material is removed by feeding the tool at a rate of $h_o$ per revolution in a direction parallel to the axis of rotation. For analysis of tool motion, this turning can be transformed into two-dimensional machining by unwrapping each revolution of the cylindrical workpiece surface onto a plane surface, as represented in FIG. 2. A Cartesian frame of reference can be established with the x-axis along the circumferential (velocity) direction and the y-axis along the axial (feed) direction. The cutting is then realized by two-dimensional motion of the tool in the x-y plane, as in FIG. 2. Each revolution of the cylindrical workpiece is now transformed into one complete cycle of cutting across the plane from x=0 to x=$\pi d$ (the workpiece circumference) with the subsequent cycle beginning again at x=0 and proceeding along the y-axis. FIG. 2 depicts two successive cycles or traverses of the tool, with a shaded region therebetween representing an undeformed chip thickness, h(x). If a sinusoidal feed-modulation of amplitude A and frequency $f_m$ is superimposed, then the position of the tool during the nth cycle can be described as $$y_n(x) = (n-1)h_o + h_o x/(\pi d) + A \sin(2\pi x/\lambda + (n-1)\phi), \quad 0 \le x \le \pi d \quad (1)$$

$$\lambda = \pi d f_w / f_m \quad (2)$$

$$\phi = 2\pi(f_m/f_w - INT[f_m/f_w]), \quad 0 \le \phi < 2\pi \quad (3)$$

where λ is the spatial wave length of the sinusoidal path and ϕ is a measure of the phase difference ($0 \leq \phi < 2\pi$) between two consecutive cycles (FIG. 2). In Eq. (3), 'INT[ ]' denotes the integer part of the value.

When the tool does not completely disengage from the workpiece during any portion of a path, then any two consecutive paths of the tool, $y_n(x)$ and $y_{n-1}(x)$, will not intersect. FIG. 2 shows one such example. The undeformed thickness of the chip at any stage of the cutting is then obtained simply as $$h(x) = y_n(x) - y_{n-1}(x) \quad (4a)$$

Generally, the undeformed chip thickness at steady state can be represented as $$h(x) = y_n(x) - \max(y_i(x)) \; i = 1, 2, \ldots n-1 \quad (4b)$$

which takes into account the cumulative effect of the prior cutting paths in determining the steady state profile of the machined surface.

The minimum amplitude for effecting discrete chip formation is obtained by setting $h(x) = 0$ in Eq. (4b). By incorporating Eqs. (1), (2) and (3) into Eq. (4b), it may be shown that this minimum amplitude, in non-dimensional form, is given by $$A/h_o = 1/[2 \sin(\phi/2)] \quad (5)$$

Figures 3, 4:
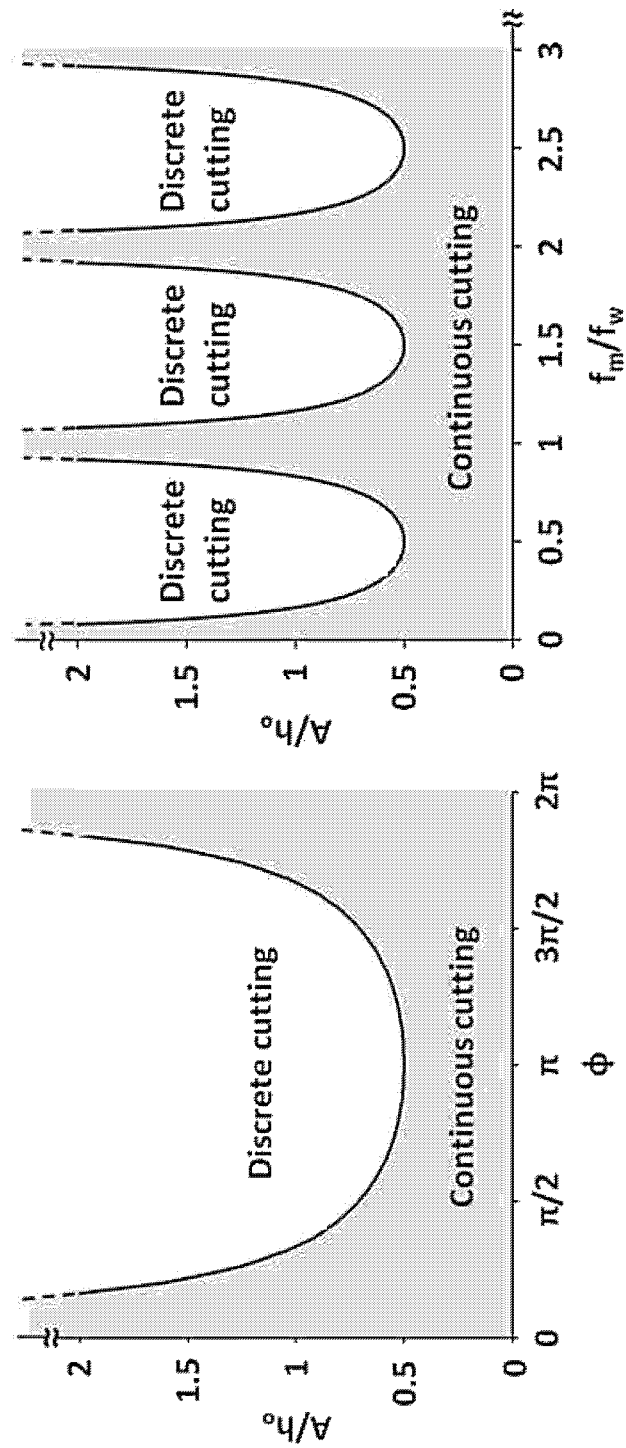
FIGS. 3 and 4 represent cutting regimes of a feed-direction modulation-assisted machining technique, and depict a transition that occurs across U-shaped curves and separates a continuous cutting (continuous chips) regime from a discrete cutting (discrete chips) regime.

FIG. 3 shows this dependence of $A/h_o$ on ϕ in graphical form. Since ϕ depends only on $f_m/f_w$ (Eq. (3)), $A/h_o$ can also be plotted as a function of $f_m/f_w$ as in FIG. 4. In this latter framework, the single curve of FIG. 3 decomposes into multiple curves. The principal characteristics of chip formation in feed-modulation can be analyzed using FIG. 3. The U-shaped curve shown in FIG. 3 marks the boundary between continuous cutting (i.e., $h(t) > 0$) and discrete cutting where feed-modulation machining conditions cause the undeformed chip thickness calculated in Eq. (4b) to periodically become equal to or less than zero (mathematically $h(t) \leq 0$, but physically the undeformed chip thickness $h(t) = 0$). Thus, the curve demarcates two distinct cutting regimes. For feed-modulation machining conditions outside the U-curve (shaded areas) in FIGS. 3 and 4, the tool is always engaged with the workpiece and cutting is continuous, despite the superimposed oscillation on the machining. Feed-modulation machining conditions inside the U-curves (unshaded areas) in FIGS. 3 and 4 result in discontinuous cutting with discrete chip formation, as well as disruption of the tool-chip contact in each cycle of modulation. Points along the U-curves in FIGS. 3 and 4 represent the minimum modulation amplitude required to effect discrete chip formation (i.e., $h(t) = 0$) at the respective values of $f_m/f_w$.

The global minimum or smallest value of A for discrete chip formation is given by $2A = h_o$ and occurs when $\phi = \pi$; this value of ϕ corresponds to $f_m/f_w = \frac{1}{2}(2N+1)$, where N is an integer (FIG. 4 and Eq. (5)). This modulation condition, with $f_m/f_w = \frac{1}{2}(2N+1)$ and peak-to-peak amplitude, $2A = h_o$, is labeled as the optimum modulation condition. At other values of this frequency ratio, the minimum peak-to-peak amplitude, 2A, for discrete chip formation is greater than $h_o$. Eq. (5) and FIGS. 3 and 4 also show specific instances where the conditions of modulation are not sufficient to realize discrete chip formation. At the asymptotic ends of each of the U-curves corresponding to $f_m/f_w = N$, successive cutting cycles are in phase and discrete chip formation is never realized regardless of the magnitude of A. Instead, a continuous chip of constant thickness should be expected to form at all machining conditions when the ratio $f_m/f_w$ is an integer.

Amplitude-frequency conditions for describing chip formation with tools having multiple cutting edges, such as in drilling, can be established in an analogous way. It will suffice to state here that for a tool with k cutting edges, Eq. (5) and FIGS. 3 and 4 can still be used to demarcate the boundary between the discrete and continuous cutting regimes if $f_w$ is replaced everywhere in the equation (and the figure) by $kf_w$ and $h_o$ by $h_o/k$. The optimum modulation condition for this case then becomes $2A = h_o/k$ with $f_m/f_w = k(2N+1)/2$.

It is of interest to highlight some of the applications-related aspects of the kinematics of feed-modulation machining. Eq. (5) indicates that the amplitude condition for discrete chip formation and tool-chip contact disruption can be realized even at high cutting speeds, which is in contrast to the velocity-modulation case. For example, since amplitudes as large as 0.2 mm can be achieved using piezo-type actuators in low-frequency modulation (for example, $f_m < 1000$ Hz), feed-modulation machining is capable of effecting discrete formation even at cutting speeds of up to 1000 m/min or more. As such, feed-modulation can be especially well suited for implementation at cutting speeds typical of industrial practice. Conditions for enhancing fluid action in the intimate contact region can be potentially realized even at such extreme speeds. Furthermore, the overall material removal rate (MRR) in feed-modulation machining is determined only by the machining conditions and not affected by the modulation parameters. That is, the mere superimposition of the modulation to the machining, while effecting discrete chips, does not change the MRR which is already prescribed by the baseline machining parameters.

Eq. (5) and FIGS. 3 and 4 provide guidelines for setting the amplitude-frequency conditions to effect discrete chip formation. In general, the minimum amplitude (optimum) condition is to be preferred, unless process constraints on $f_m$ and A warrant otherwise. Of course, in practice, to achieve discrete chips, the modulation amplitude may have to be set somewhat higher than the minimum values predicted by Eq. (5) to compensate for system compliance, a factor not considered in the analysis leading to Eq. (5). With regard to selection of the specific $f_m/f_w$ ratio for discrete cutting (FIG. 4), it may generally be preferable to use the larger values of this ratio, as this would cause the chip formation to be interrupted more frequently, resulting in smaller discrete chips and improved lubrication of the contact. Indeed, high values for this ratio result in very short, fiber-like chips, an aspect that can be exploited to produce particulate and fibers by feed-modulation machining. However, the largest $f_m/f_w$ ratio achievable in practice will be determined by the maximum amplitude that the modulation device can provide at a particular modulation frequency. Lastly, to avoid rubbing between the tool flank and the freshly generated surface, the tool clearance angle should satisfy a constraint that is generally met in practice.

Generally, modulation-assisted machining that utilizes a superimposed modulation in the direction of the cutting velocity or tool feed (undeformed chip thickness, $h_o$) is capable of generating surfaces with various textures. By applying the principals discussed above, the present invention has identified the use of a controlled superimposed modulation applied through a feed-modulation machining technique as capable of generating surfaces with various controllable textures, including but not limited to waviness, geometric features, etc. As a form of feed-modulation machining, the controlled modulation is superimposed in the direction of the tool feed (undeformed chip thickness, $h_o$)

and the undeformed chip thickness, $h_o$, typically varies during each cycle of modulation resulting in discrete small chips or continuous chips of varying thickness along their length. Feed-modulation machining can be implemented alone or in combination with velocity-modulation (modulation in the direction of the cutting velocity, $V_c$), in which case the cutting velocity varies periodically and, with appropriate machining parameters, becomes zero during each cycle of modulation. In addition to the texturing capability provided by superimposed modulation, texturing effects can be further promoted or modified through control of tool geometric features. Lastly, by appropriately controlling machining and modulation conditions, it has been shown that the microstructure of the material at and immediately beneath the resulting machined surface can be controlled. It has also been noted that chip formation in feed-modulation machining occurs under transient deformation conditions. Under these types of conditions, material removal can be accomplished with less chip strain and consequently reduced energy consumption, leading to improved energy efficiency in machining, chip management and recycling/re-use, and powder particulate manufacturing.

According to preferred aspects of the invention, geometric parameters related to texture (surface topography), including waviness, roughness, feature shape and size, can be determined by modulation conditions (e.g., frequency, amplitude) and their relative orientations, which can be further modified with more conventional machining parameters (for example, cutting velocity (speed), feed, and tool geometry). In the present invention, such parameters are intentionally selected to produce certain a range of surface textures on a component surface.

From the discussion above pertaining to chip formation in feed-modulation machining (Eqs. (1)-(4b)), it should be evident that feed-modulation machining offers additional degrees of freedom for controlling the tool motion that can be utilized to control the texture (three-dimensional topography) of a surface being machined using a feed-modulation machining technique. In an investigation leading to the present invention, cylindrical turning simulations were performed using Eqs. (1)-(4b) to model tool motion in cylindrical turning operations that were modified to include superimposed feed-modulation techniques. The calculations were carried out until the simulated machined surface of the modeled cylinder reached a steady-state profile. The existence of unique steady-state profiles was confirmed for a range of typical initial conditions.

Figure 5:
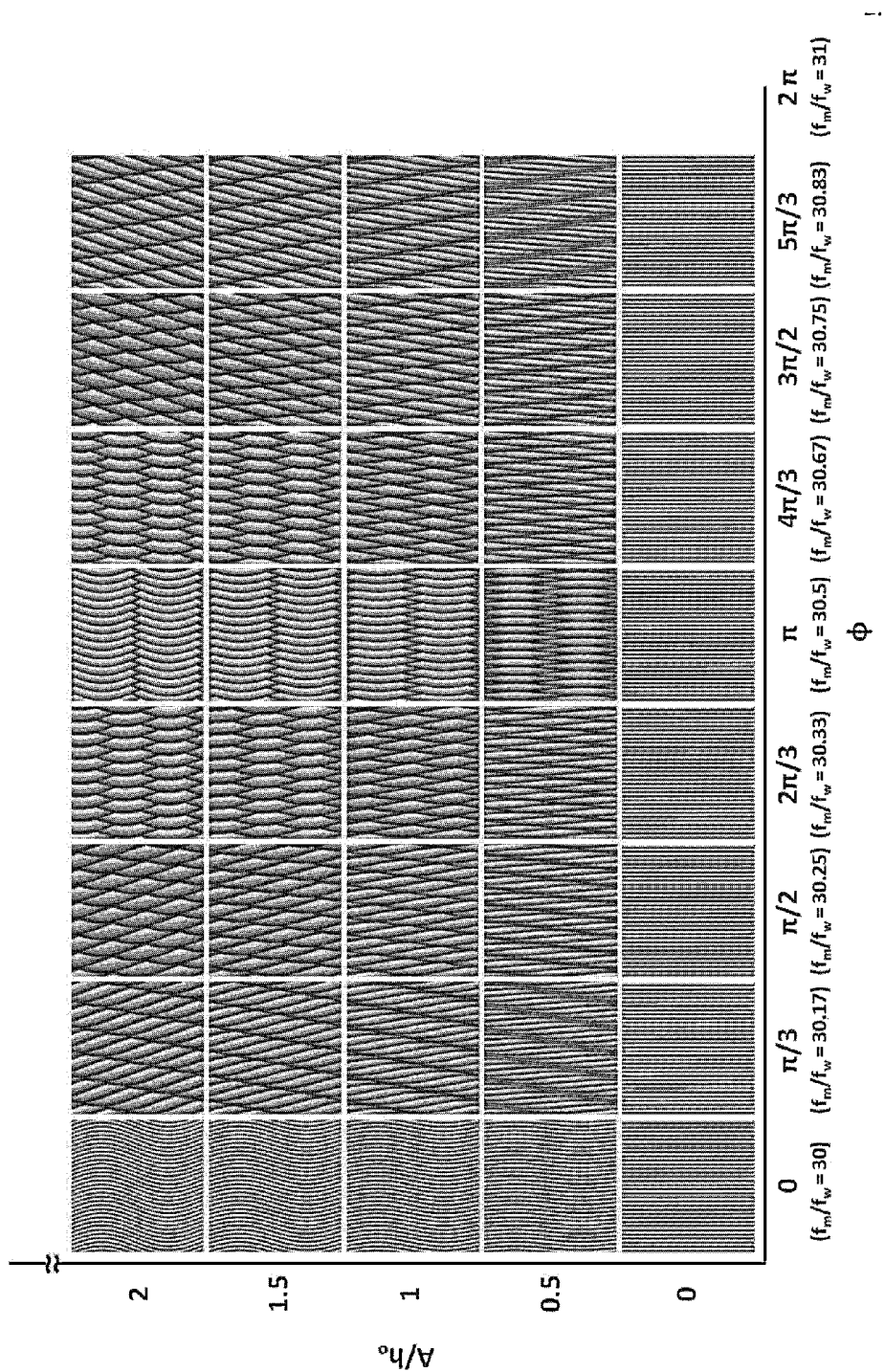
FIG. 5 shows steady-state surface textures predicted by cylindrical turning simulations for various amplitudes and various phase differences and modulation frequencies.

FIG. 5 shows steady-state surface textures predicted by the cylindrical turning simulations for various amplitudes ($A/h_o$ ranging from 0 to 2) and various phase differences ($\phi$) and modulation frequencies ($f_m/f_w$ ranging from 30 to 30.83). Each image in FIG. 5 represents the surface texture over a 0.6×0.6 mm² surface patch and is based on $h_o$ 0.01875 mm (feed/rev), depth of cut=0.15 mm, and the following specific tool geometry: tool nose radius of about 0.02 mm, a rake angle of 0 degree, a lead angle of 0 degree, and a front relief angle of 5 degrees. For reference, the bottom row in FIG. 5 depicts surfaces created by conventional machining (where $f_m$=0 or A=0). The types of surface textures seen in the top four rows are quite remarkable and difficult to achieve in practice on metal surfaces using conventional material removal processes. A consideration of the tool motion shows that the shapes of the surface features are primarily determined by $\phi$ and $A/h_o$. In view of piezo-based modulation devices of the type disclosed in U.S. Pat. No. 7,587,965, commercial embodiments of which are commercially available from M4 Sciences LLC, it was concluded that it should be possible to create a range of surface textures using the M4 Sciences devices. Moreover, because modulation amplitude and frequency can be continuously varied with such devices, for example, amplitudes of up to at least 0.2 mm and modulation frequencies of up to at least 2000 Hz, essentially infinite resolution should be achievable.

Figure 6:
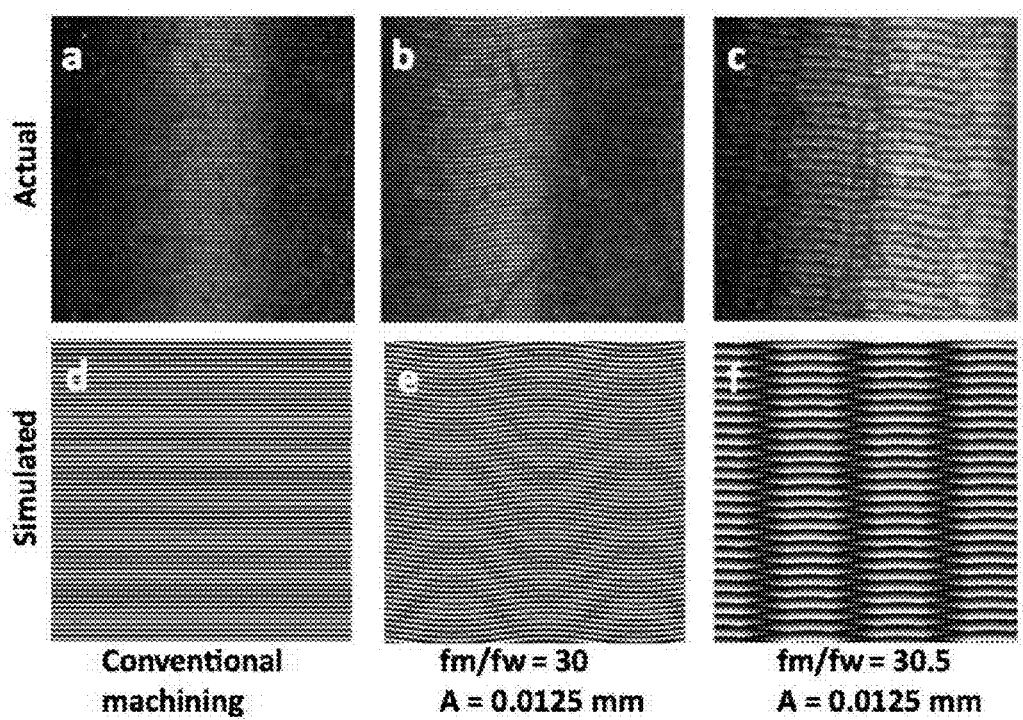
FIG. 6 contains scanned images (a)-(c) of actual surface textures created by a conventional cylindrical turning process and a cylindrical turning process modified to include a feed-direction modulation-assisted machining technique of the invention, and also contains images (d)-(f) generated by simulations conducted to predict surface textures that would be produced by the conventional cylindrical turning process of image (a) and the feed-direction modulation-assisted machining techniques of images (b) and (c).

In FIG. 6, the top row of images (a through c) are macrographs of actual profiles generated in cylinder turning experiments at the same conditions as three of the simulations in FIG. 5, reproduced in the bottom row of images (d through f) in FIG. 6. In particular, the images correspond to: (a and d) conventional machining with no modulation; (b and e) feed-modulation machining with continuous cutting ($f_m/f_w$=30); and (c and f) feed-modulation machining with discrete cutting (f $f_m/f_w$=30.5). The correlation between the two sets of profiles is quite striking, demonstrating the capability of the simulation as a tool to explore surface generation in feed-modulation machining. Since such functional characteristics as running in, oil retention, wear, etc., of a surface are determined at least in part by its surface textures, the ability of a feed-modulation machining technique to predictably and controllably produce a range of different surface textures has the potential to enable the surface texture of a surface to be tailored to promote one or more particular functional characteristics, which in turn can be specifically intended to address operating conditions to which the surface is to be subjected.

Figure 7:
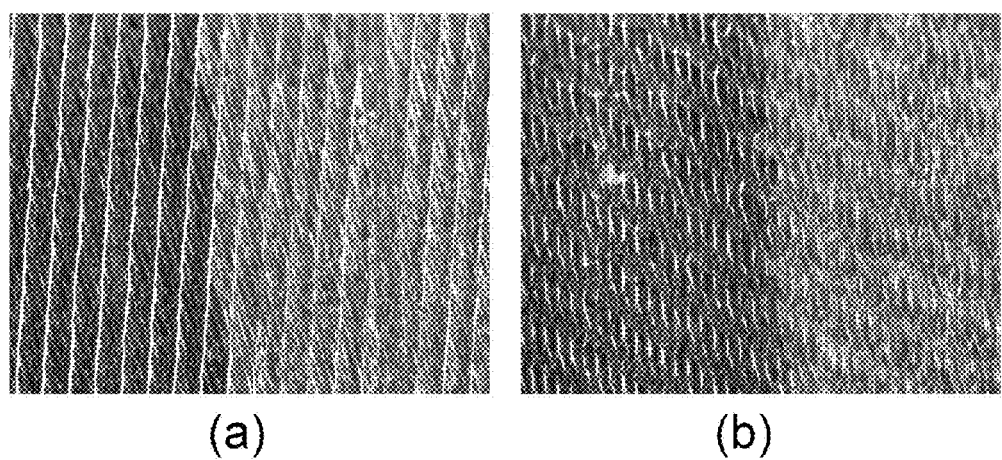
FIGS. 7(a) and (b) are scanned images comparing surface textures created on component surfaces by, respectively, a conventional cylindrical turning process and a cylindrical turning process modified to include a feed-direction modulation-assisted machining technique within the scope of the invention.

FIGS. 7(a) and (b) show additional images of surface textures produced by cylindrical turning. The image in FIG. 7(a) shows the surface texture created on the surface of a part by conventional machining process ($f_m$=0 or A=0). The surface in (a) depicts a typical pattern created when a cutting tool traverses along a workpiece surface with respect to the workpiece rotation. The image in FIG. 7(b) shows the surface texture created on the surface of a part by machining with modulation-assisted machining. The surface texture is comprised of several sinusoidal features that were created as a result of the cutting tool overlapping the surface during the feed-direction modulation-assisted machining technique. In both images, the surface portion on the righthand side of the image was machined without the presence of any fluids, while the surface portion on the lefthand side of the image was machined in the presence of isopropyl alcohol fluids.

Figure 8:
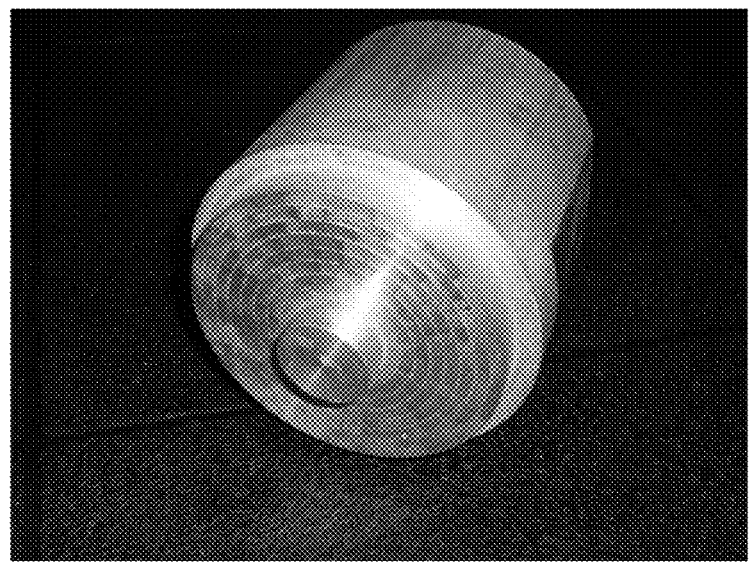
FIG. 8 is a scanned image showing an end-face of a component part machined with a trepanning tool and using a feed-direction modulation-assisted machining technique within the scope of the invention.

FIG. 8 contains an image that shows surface texturing in the end-face of a part that had been machined with a trepanning tool using a feed-direction modulation-assisted machining technique of this invention. Finally, FIG. 9 contains an image showing surface texturing in the form of a sinusoidal pattern that was generated at the bottom of a drilled hole using a feed-direction modulation-assisted machining technique of this invention. The textured surface shows a characteristic waviness that is associated with the modulation-assisted machining applied during drilling as a result of the drill cutting edges traversing a sinusoidal profile at the bottom of the drilled hole.

Figure 9:
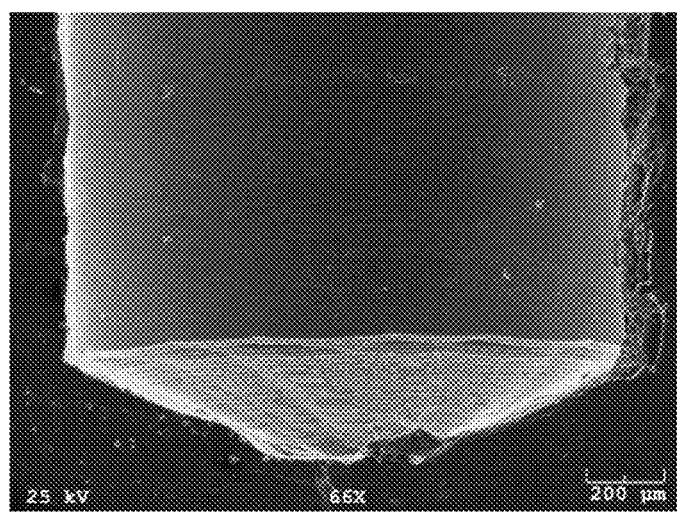
FIG. 9 is a scanned image showing sinusoidal pattern created at the bottom of a drilled hole using a feed-direction modulation-assisted machining technique within the scope of the invention.

In view of the above, attractive features of feed-modulation machining techniques of this invention include the ability to generate a predetermined surface texture over large areas, such as (but not limited to) the circumferential external surface of a cylinder, as well as flat surfaces and internal (hole) surfaces (FIG. 9). The invention is believed to be applicable to component surfaces of various geometries (for example, flat and curved), applicable to a range of material systems, and capable of creating features at length scales ranging from a few nanometers to millimeters. These preferred aspects of the invention are a consequence of the ability to control tool motion in various dimensions with essentially infinite resolution using, for example, piezo-based actuation devices.

Other potential aspects of the invention relate to the ability of feed-modulation machining techniques to produce small discrete chips when machining ductile alloys, with important changes to the mechanics of machining. The modulation conditions for creating discrete chips can be identified in frequency-amplitude space, for example, as represented in FIGS. 3 and 4. Complementing chip formation is the fact that the surface texturing of a machined surface can be intentionally influenced by modulation conditions that are capable of producing discrete chips over a range of conditions. The conditions that exist during discrete chip formation should also serve to disrupt the severe contact conditions prevailing at the chip-tool interface, facilitating, among other things, fluid action along the contact. The consequences of producing small discrete chips and reducing the severity of the tool-chip contact have the potential for a variety of performance-related benefits, such as reduction in tool wear, reduction of machining cycle time, controlled surface texturing, smaller energy dissipation and ability to effect machining operations that are difficult, if not impossible, to accomplish without modulation. The ability to produce small chips of well-defined size can also be exploited for achieving improved chip management, including recycling and re-use of chips in high-value products.

Since the feed-modulation machining techniques of this invention are variants of machining processes that can be carried out on otherwise conventional equipment often used to produce industrial components, the principles of scale-up (for example, geometry, dimensions, production throughput) of industrial machining operations can be directly translated to feed-modulation machining techniques of this invention. Thus texturing by feed-modulation machining should be capable of offering superior capabilities as compared to conventional texturing methods, for example, imprint lithography, electro-discharge machining, electrochemical machining, and laser beam processing. Through further study and development of the fundamentals of feed-modulation machining for the purpose of surface texturing, it should be feasible to define what types (ranges) of surface textures can be created and to specify certain feed-modulation machining parameters required to create a specific texture. Principals of the feed-modulation machining techniques of this invention should be applicable to machining processes that use single-edged (for example, lathe turning) and multi-edged (for example, milling, grinding, drilling) cutting tools.

The above-noted aspects are significant because surface texturing is an important variable that affects the functional performances of a variety of components, including bearing surfaces whose functional characteristics, such as run-in, wear, torque and lubrication, are determined by the surface texture. The above-noted aspects are also significant for other functional characteristics of interest, for example, reflectivity, assembly, coupling, etc. With the ability to effect surface texturing over large areas, it may thus be feasible to enhance performance parameters of a wide variety of components and products, including durability and energy efficiency.

Microstructure effects (morphology) are another potential aspect of the invention. Detailed studies of the microstructure of chips and the resulting surfaces of workpieces have shown that the microstructures of a chip and the workpiece surface from which it was machined are nearly identical. The depth of the surface microstructure that is altered by the machining process is dependent upon such parameters as the depth of cut, tool geometry and local temperatures during the cutting process. Important parameters relating to microstructure have been determined using such tools as particle image velocimetry (PIV), electron back scatter diffraction (EBSD) data, and select transmission electron microscopy (TEM) observations of workpiece surfaces using samples extracted by focused ion beam (FIB) processing. It is believed that chips and workpieces surfaces produced by the feed-modulation machining techniques of this invention will yield similar results.

While the invention has been described in terms of particular embodiments, it is apparent that other forms could be adopted by one skilled in the art. Accordingly, the scope of the invention is to be limited only by the following claims.

The invention claimed is:

1. A method of machining a body to produce chips and generate a machined surface having a predetermined surface texture, the method comprising:
    performing a simulation in which multiple predicted surface textures are generated for multiple values for modulation amplitudes and multiple values for modulation frequencies;
    selecting the predetermined surface texture for a surface of the body; and then
    imposing a superimposed sinusoidal feed-modulation on a cutting tool so as to move the cutting tool in a feed direction relative to the body while machining the body with the cutting tool to generate the predetermined surface texture in a machined surface of the body, the superimposed sinusoidal feed-modulation comprising a modulation frequency and a modulation amplitude in the feed direction;
    wherein the predetermined surface texture of the machined surface is intentionally controlled by at least the modulation amplitude and the modulation frequency of the superimposed sinusoidal feed-modulation;
    wherein the step of selecting the predetermined surface texture comprises selecting one of the multiple values for the modulation amplitudes and one of the multiple values for the modulation frequencies as the modulation frequency and the modulation amplitude used in the step of imposing the superimposed sinusoidal feed-modulation to generate the predetermined surface texture.

2. The method according to claim 1, wherein the modulation amplitude of the superimposed sinusoidal feed-modulation causes periodic engagement and separation between the cutting tool and the body at an intimate region of contact therebetween.

3. The method according to claim 1, wherein the superimposed sinusoidal feed-modulation is imposed to produce discrete chips in the form of particulates or platelets.

4. The method according to claim 1, wherein the superimposed sinusoidal feed-modulation is imposed to produce continuous chips in the form of ribbons, wires or filaments.

5. The method according to claim 1, wherein the body rotates about an axis thereof and the superimposed sinusoidal feed-modulation comprises movement of the cutting tool perpendicular to the axis of the body.

6. The method according to claim 1, wherein the machining of the body is characterized by a cutting velocity in a cutting direction relative to the body, the method further comprising imposing a superimposed sinusoidal velocity-modulation on the cutting tool so as to move the cutting tool in the cutting direction relative to the body.

7. The method according to claim 1, wherein the superimposed sinusoidal feed-modulation induces a microstructure in the chips and in the machined surface of the body.

8. The method according to claim 1, wherein the surface texture is characterized by a sinusoidal profile on the machined surface or sinusoidal pattern in the machined surface.

9. A method of machining a body to produce chips and generate a machined surface having a predetermined surface texture, the method comprising:
performing a simulation in which multiple predicted surface textures are generated for multiple values for modulation amplitudes and multiple values for modulation frequencies;
selecting the predetermined surface texture for a surface of the body;
rotating at least one of a cutting tool and the body while machining the body with the cutting tool; and then
imposing a superimposed sinusoidal feed-modulation on the cutting tool so as to move the cutting tool in a feed direction relative to the body while machining the body with the cutting tool to generate the predetermined surface texture in a machined surface of the body, the superimposed sinusoidal feed-modulation comprising a modulation frequency and a modulation amplitude in the feed direction that causes an uncut chip thickness of the machining to vary with time;
wherein the predetermined surface texture of the machined surface is intentionally controlled by at least the modulation amplitude and the modulation frequency of the superimposed sinusoidal feed-modulation;
wherein the step of selecting the predetermined surface texture comprises selecting one of the multiple values for the modulation amplitudes and one of the multiple values for the modulation frequencies as the modulation frequency and the modulation amplitude used in the step of imposing the superimposed sinusoidal feed-modulation to generate the predetermined surface texture.

10. The method according to claim 9, wherein the modulation amplitude of the superimposed sinusoidal feed-modulation causes periodic engagement and separation between the cutting tool and the body at an intimate region of contact therebetween.

11. The method according to claim 9, wherein the superimposed sinusoidal feed-modulation is imposed to produce discrete chips in the form of particulates or platelets.

12. The method according to claim 9, wherein the superimposed sinusoidal feed-modulation is imposed to produce continuous chips in the form of ribbons, wires or filaments.

13. The method according to claim 9, wherein the body rotates about an axis thereof and the superimposed sinusoidal feed-modulation comprises movement of the cutting tool perpendicular to the axis of the body.

14. The method according to claim 13, wherein the machining of the body is characterized by a cutting velocity in a cutting direction parallel to the axis of the body, the method further comprising imposing a superimposed sinusoidal velocity-modulation on the cutting tool so as to move the cutting tool in the cutting direction.

15. The method according to claim 9, wherein the superimposed sinusoidal feed-modulation induces a microstructure in the chips and in the machined surface of the body.

16. The method according to claim 9, wherein the surface texture is characterized by a sinusoidal profile on the machined surface or sinusoidal pattern in the machined surface.

* * * * *